United States Patent [19]

Ludwig

[11] Patent Number: 4,483,555

[45] Date of Patent: Nov. 20, 1984

[54] PIPE COUPLING

[75] Inventor: Dieter Ludwig, Weinheim, Fed. Rep. of Germany

[73] Assignee: Deere & Company, Moline, Ill.

[21] Appl. No.: 404,189

[22] Filed: Aug. 2, 1982

[30] Foreign Application Priority Data

Aug. 6, 1981 [EP] European Pat. Off. ........ 81303604.3

[51] Int. Cl.³ .............................................. F16L 19/06
[52] U.S. Cl. .................................... 285/169; 285/341; 285/382.7
[58] Field of Search ... 285/382.7, 343, 341 (U.S. only), 285/249 (U.S. only), 341, 249, 31, 32, 342, 169

[56] References Cited

U.S. PATENT DOCUMENTS

| Re. 22,713 | 1/1946 | Howe | 285/382.7 X |
|---|---|---|---|
| 1,997,845 | 4/1935 | Adams | 285/341 X |
| 2,423,655 | 7/1947 | Mars et al. | 285/341 |
| 2,821,567 | 1/1958 | Bergan | 285/249 |
| 3,006,558 | 10/1961 | Jacobs | 285/343 X |
| 3,326,582 | 6/1967 | Currie | 285/382.7 X |
| 4,309,050 | 1/1982 | Legris | 285/341 |

FOREIGN PATENT DOCUMENTS

| 542645 | 9/1959 | Belgium | 285/341 |
|---|---|---|---|
| 686504 | 5/1964 | Canada | 285/343 |
| 2244862 | 12/1973 | Fed. Rep. of Germany | 285/382.7 |
| 884283 | 8/1943 | France | 285/341 |
| 2406773 | 6/1979 | France | 285/341 |
| 1016347 | 1/1966 | United Kingdom | 285/343 |

OTHER PUBLICATIONS

"The Leakfree Connection", Design Engineering, Dec. 1981, pp. 33-38.

Primary Examiner—Thomas F. Callaghan

[57] ABSTRACT

A pipe coupling is disclosed which is capable of being periodically coupled and uncoupled between two lengths of pipe. The pipe coupling includes a first and a second union which are fixed between an intervening length of pipe such that the intervening length of pipe does not have to be of a precision length. The outer periphery of one end of the pipe contains serrations and this end is fixed to the first union by a serrated compression ring and a backnut. By tightening the backnut onto the first union, the compression ring firmly engages the serrations on the pipe and prevents axial movement thereof. The second union includes a non-binding compression ring and a backnut as well as having an internal elongated bore of approximately the same diameter as the outer diameter of the pipe. As the backnut is tightened onto the second union, the compression ring is squeezed about the outer periphery of the pipe and forms a seal therewith. One benefit of this second union is that it can be repeatedly coupled and uncoupled relative to the pipe to permit the intervening length of pipe to be moved into or out of the second union as the need arises. The second union also permits a tight seal to be formed even when a limited amount of misalignment exist between the pipe and the second union.

3 Claims, 1 Drawing Figure

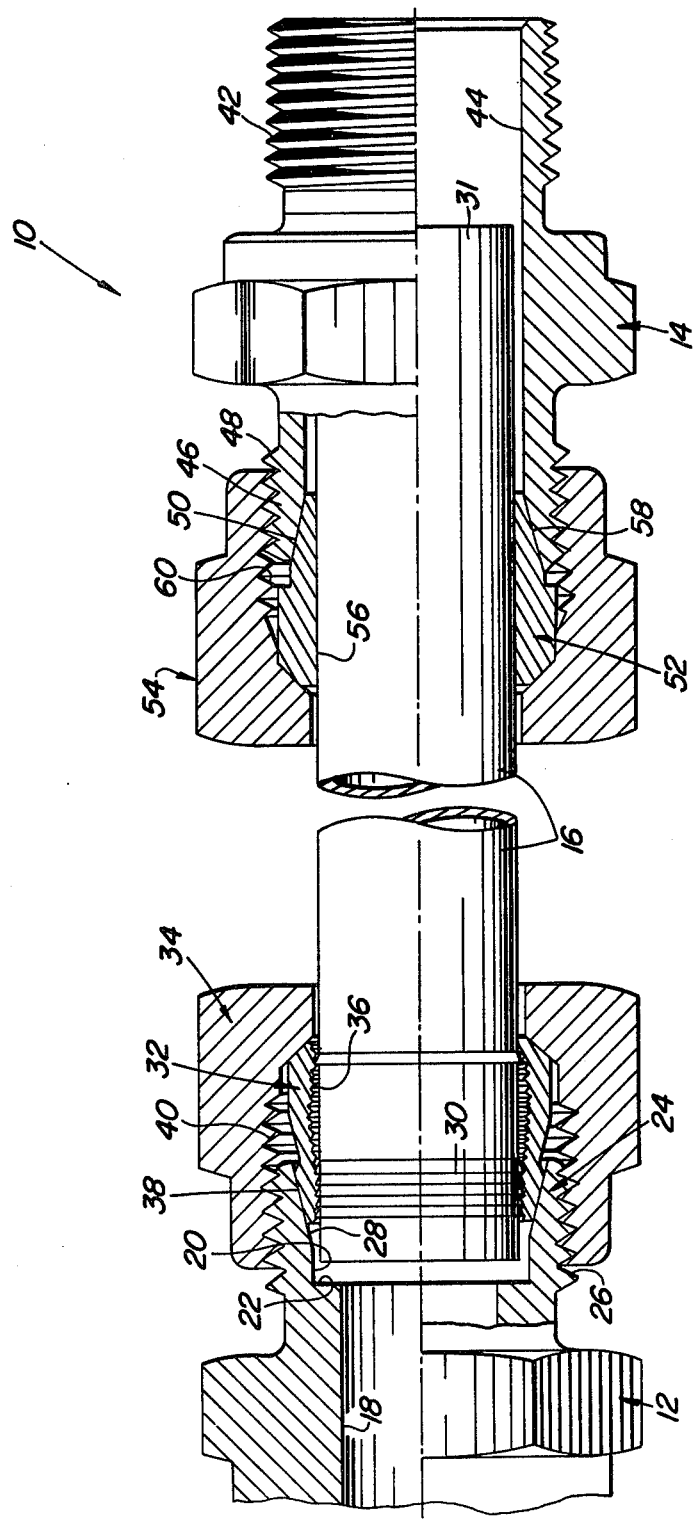

PIPE COUPLING

FIELD OF THE INVENTION

This invention relates to a pipe coupling which is capable of being periodically coupled and uncoupled while permitting longitudinal shifting of an intervening length of pipe.

BACKGROUND OF THE INVENTION

In many hydraulic applications, it is necessary to connect two sections of pipe together using a coupling which will also permit disconnection at a later period in time. Many times it is necessary to connect two lengths of pipe together using an intervening pipe so as to take up longitudinal play between two fixed pipes. Such is true especially in hydraulic lines used on agricultural and earth moving equipment wherein it is difficult to maintain precise alignment in spacing of parts. In addition, a satisfactory installation of hydraulic lines on motor vehicles normally entails the use of coupling fittings.

One type of a pipe fitting is taught in U.S. Pat. No. 4,309,050. In this particular patent, a serrated collar is used which mates with serrations formed on the inserted end of the pipe. Such a fit is beneficial for high pressure fluid connections but the fit has a disadvantage in that after repeated connections and disconnections, the serrated fit fails to tightly couple the pipes together. In addition, the use of two such couplings on the ends of an intervening length of pipe prevent longitudinal shifting of the pipe relative to the two unions.

Now a pipe coupling has been invented which is capable of being coupled and uncoupled repeatedly while at the same time permitting longitudinal shifting of an intervening length of pipe.

SUMMARY OF THE INVENTION

Briefly, this invention relates to a pipe coupling capable of being periodically coupled and uncoupled to two different sections of fixed piping. The pipe coupling includes first and second unions which are fitted to an intervening length of pipe. The pipe contains serrations formed about its outer periphery at one end and has the first union fitted thereto by means of an internally serrated compression ring which is held secure to the first union by first backnut. A second union is fitted to the opposite end of the pipe by a nonbinding compression ring which is held secure to the second union by a second backnut. The second union is capable of being repeatedly coupled and uncoupled while permitting longitudinal shifting of the pipe relative to the union while in the coupled condition.

The general object of this invention is to provide a pipe coupling which can accommodate a nonprecise length of intervening pipe and which adjusts simply in accordance with the actual spacing encountered between the two unions. A more specific object of this invention is to provide a pipe coupling which can be repeatedly coupled and uncoupled without encountering linkage problems.

Another object of this invention is to provide a pipe coupling which will tolerate misalignment between the axis of the pipe and the pipe union.

Still another object of this invention is to provide a pipe coupling which is economical to manufacture and simple to use.

Still further, an object of this invention is to provide a pipe coupling which can be used to couple two lengths of pipe together without the need of any special tools.

Other objects and advantages of the present invention will become more apparent to those skilled in the art in view of the following description and the accompanying drawing.

BRIEF DESCRIPTION OF THE DRAWING

The drawing is an elevational view, partly in section, of the pipe coupling of this invention.

DETAILED DESCRIPTION OF THE PREFERRED EMBODIMENT

Referring to the drawings, a pipe coupling 10 is shown which includes a first and a second union, 12 and 14 respectively, joined together by an intervening length of pipe 16. The first union 12 contains a through bore 18 which is aligned with the opening of a pipe on which the first union 12 is permanently attached (not shown) and which opens to a larger cavity 20 which is capable of receiving one end of the pipe 16. An internal shoulder 22 is formed at the point where the larger cavity 20 meets the bore 18. This internal shoulder 22 serves as a stop to limit the amount that the pipe 16 can be inserted into the first union 12. The first union 12 also contains an outward projecting sleeve portion 24 which has external threads 26 formed thereon and which has an internal surface 28 which tapers towards the shoulder 22.

The pipe 16 which fits into the first and second unions 12 and 14 respectively, has a serrated outer periphery 30 approximate one end and a smooth outer periphery 31 approximate an opposite end. The serrated end 30 of the pipe 16 engages with the first union 12 by means of a compression ring 32 and a backnut 34. The compression ring 32, which is preferably a metallic member, contains an internal serrated surface 36 and a tapered outer surface 38. The internal serrated surface 36 cooperates with the serrations 30 formed on the pipe 16 and the tapered outer surface 38 mates with the tapered surface 28 formed on the first union 12. The backnut 34 which contains an internal threaded bore 40 is tightened onto the external threads 26 of the first union 12 by means of a wrench. As the backnut 34 is screwed onto the threads 26, the compression ring 32 is axially moved into alignment with the tapered surface 28 of the sleeve portion 24 and forms a tight fit therewith. This assures that the pipe 16 is axially restrained relative to the first union 12.

The second union 14 is also permanently attached to a second pipe member (not shown) by conventional means. One means being by the external threads 42 shown at the right of the second coupling 14. The second coupling 14 also contains a through bore 44 which preferably is of a constant diameter and which is slightly larger than the diameter of the pipe 16. This elongated bore 44 permits the pipe 16 to be inserted partially or fully into the second coupling 14 such that a precise length of the pipe 16 is not needed. The second bore 14 also contains an outwardly projecting sleeve 46 which contains external threads 48 and an internal tapered surface 50. Once the smooth end 31 of the pipe 16 is inserted into the second union 14, a compression ring 52 and a second backnut 54 are used to hold the pipe 16 in place. The compression ring 52, which is preferably a nonmetallic material such as plastic, contains an internal bore 56 which is approximately equal to the outside diameter of the pipe 16 and has an external tapered surface 58 which mates with the tapered surface 50 formed on the sleeve portion 46 of the first union 14. As the backnut 54, which contains an internal threaded bore 60, is tightened onto the external threads 48 of the second union 14, the compression ring 52 is squeezed onto the periphery of the pipe 16. The significance of this is that, unlike the metal compression ring 32, the nonmetallic compression ring 52 will not bind onto the pipe 16 even after repeated tightening and loosening of the backnut 54. Accordingly, it is possible to connect and disconnect the coupling several times, for example to adjust the location of the compression ring 52 on the pipe 16, without encountering leakage problems. In addition, the nonmetallic sleeve 52 allows for axial and radial positioning of the pipe 16 relative to the second union 14. This enables a tight seal to be formed even when a reasonable amount of misalignment is present between the axis of the pipe 16 and the axis of the union 14.

Although the compression ring 52 may be independent of the backnut 54, it is possible to incorporate the two members such that the nonmetallic compression ring 52 is formed integral with the backnut 54. For certain applications, it may be possible to make both the backnut 54 and the compression ring 52 out of a plastic material such that they can be molded as one unit.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A pipe coupling capable of being repeatedly coupled to and uncoupled from an intervening length of pipe, said intervening length of pipe having serrations formed about the outer periphery of one end, said pipe coupling comprising:

(a) a first union attached to a first pipe and having a through bore formed therein which opens into an enlarged cavity, said cavity having an exposed end which receives said serrated end of said intervening length of pipe, an oppositely aligned shoulder formed within said first union which limits the amount said intervening length of pipe can be inserted therein and a sleeve surrounding said cavity which has an inner surface which tapers towards said shoulder and an external threaded surface;

(b) a compression ring having a threaded internal surface and a tapered external surface, said compression ring being positioned between said serrated end of said intervening length of pipe and said tapered inner surface of said sleeve;

(c) a first backnut having a threaded inner surface which engages with said external threaded surface of said first union, tightening of said first backnut onto said first union causing said compression ring to move axially into engagement with said tapered inner surface of said sleeve and to be compressed such that said threaded internal surface engages said serrated end of said intervening length of pipe and axially restrains said pipe within said cavity;

(d) a second union attached to a second pipe and having a through bore formed therein which receives an opposite end of said intervening length of pipe, said through bore having a diameter larger than the outside diameter of said intervening length of pipe, said second union having an outwardly extending sleeve with an external threaded surface and a tapered inner surface;

(e) a non-binding compression ring having a smooth bore formed therethrough with a diameter approximately equal to the outside diameter of said intervening length of pipe and an external tapered surface which mates with said tapered inner surface of said second union; and (f) a second backnut having a threaded inner surface which engages with said external threaded surface of said second union, tightening of said second backnut onto said second union causing said non-binding compression ring to move axially into engagement with said tapered inner surface of said sleeve and be squeezed onto the periphery of said intervening length of pipe, said first and second unions capable of being repeatedly coupled and uncoupled from said intervening length of pipe and said second union permitting longitudinal shifting of said intervening length of pipe relative to said second union.

2. The pipe coupling of claim 1 wherein said non-binding compression ring is non-metallic.

3. The pipe coupling of claim 1 wherein said non-binding compression ring is plastic.

* * * * *